April 29, 1924.

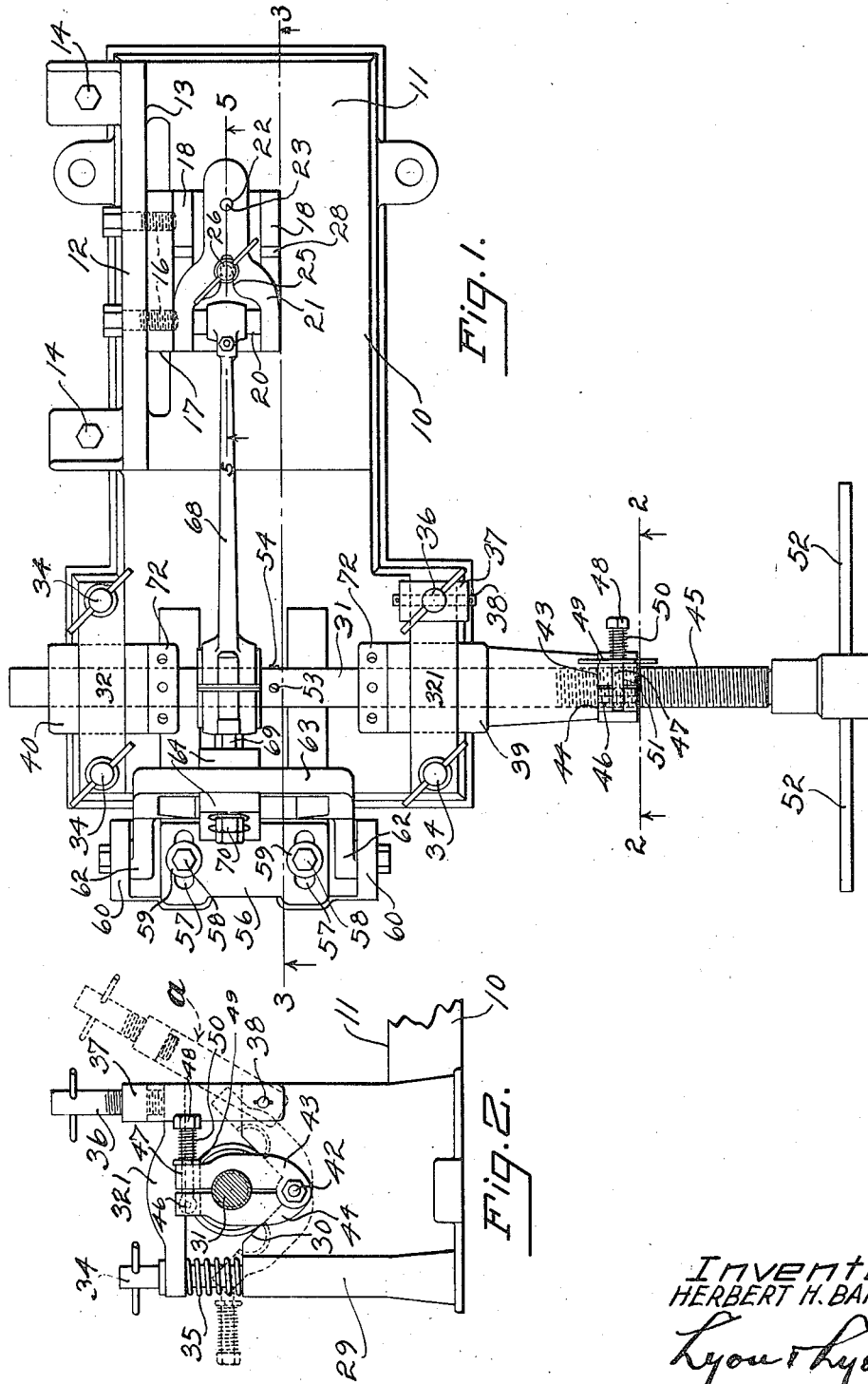

H. H. BAKER

CONNECTING ROD TOOL

Filed Aug. 22, 1922  2 Sheets-Sheet 2

Inventor
HERBERT H. BAKER
Lyon & Lyon
Attorneys

Patented Apr. 29, 1924.

1,492,062

UNITED STATES PATENT OFFICE.

HERBERT H. BAKER, OF HANFORD, CALIFORNIA.

CONNECTING-ROD TOOL.

Application filed August 22, 1922. Serial No. 583,532.

*To all whom it may concern:*

Be it known that I, HERBERT H. BAKER, a citizen of the United States, residing at Hanford, in the county of Kings and State of California, have invented a new and useful Connecting-Rod Tool, of which the following is a specification.

This invention relates to a tool used in testing connecting rods when said rods have been removed from the engine and the bearings thereof renewed, and also used for boring the connecting rod crank bearing.

The tool is used:

1. For testing the connecting rod to ascertain whether or not it is twisted;

2. To see whether the connecting rod is perfectly straight so that after it is assembled in the engine it will be exactly concentric with the cylinder and not press against one side of the cylinder and thus cause unequal wear of the piston and cylinder;

3. To check up after the piston is assembled on the connected rod to ascertain whether or not the sides of the piston are exactly at a right angle to the axis of the crank shaft so that when the piston and connecting rod are assembled in the engine the piston will be in perfect alinement with the wall of the cylinder;

4. To see that all of the pistons belonging to one engine are alike in respect to the distance between the head of the piston and the axis of the crank bearing, in order that the compression spaces in the different cylinders will be of exactly the same length so that the power impulses may be of like force in all of the cylinders.

The foregoing described uses are the same as those of the tool for testing connecting rods disclosed in my copending application for patent, Serial No. 498,963, filed September 7th, 1921. In addition to the above outlined uses, this tool is employed in boring and facing the connecting rod crank bearing.

The accompanying drawings illustrate the invention:

Figure 1 is a plan view of a tool embodying the invention.

Fig. 2 is a fragmental elevation partly in section from the line indicated by 2—2, Figure 1. Broken lines indicate the nut sections and the yoke in open portions.

Figure 3:
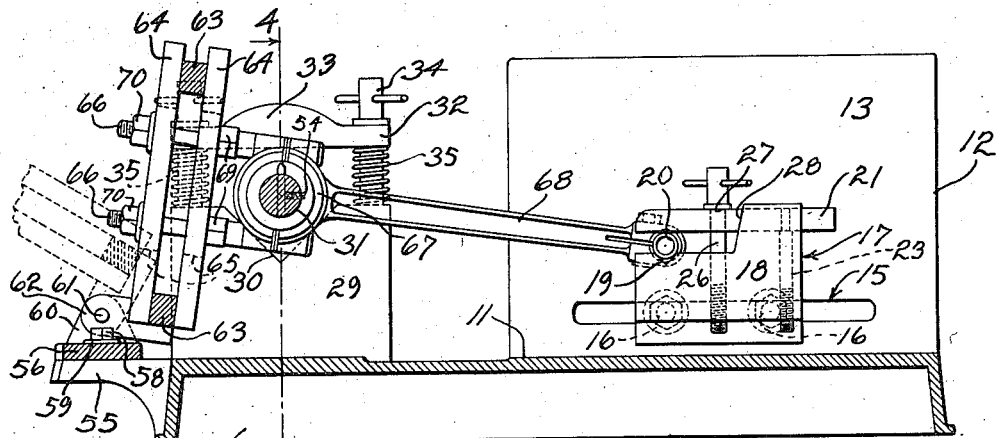
Fig. 3 is an elevation, partly in section, from the line indicated by 3—3, Figure 1. Broken lines indicate the pivoted connecting rod support thrown out of position for use.
Figure 4:
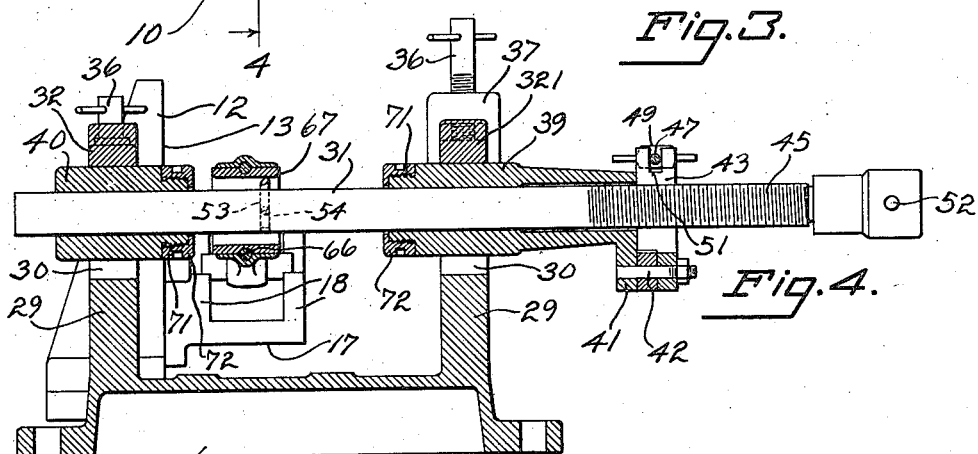
Fig. 4 is a sectional elevation on the line indicated by 4—4, Figure 3.
Figure 5:
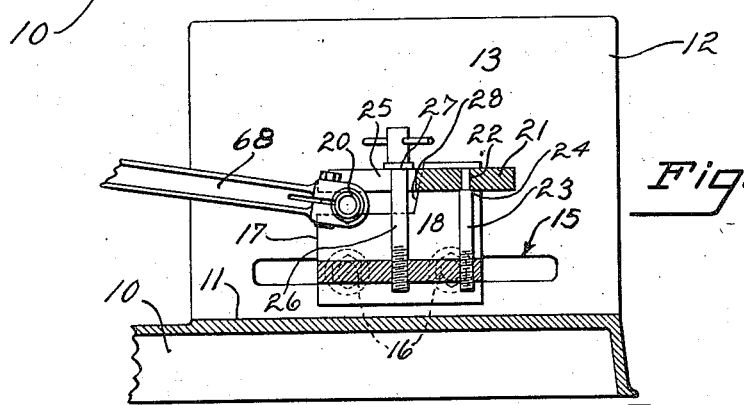
Fig. 5 is a sectional elevation on the line indicated by 5—5, Figure 1.

There is provided a base 10 having a plane face 11, from one edge of which rises a longitudinally extending standard 12. The inner face 13 of the standard 12 is in a plane exactly at right angles to the plane face 11. In the present instance the standard 12 is of separate construction from the base 10 and is secured thereto by bolts 14.

The standard 12 is provided at a slight distance above the base 11 with a longitudinally extending slot 15, through which pass cap screws 16 that are threaded into one side of a bracket 17 comprising a pair of longitudinally extending spaced standards 18 having V-shaped notches 19 in their upper edges. The notches 19 accurately position the end portions of a pin 20 so that the axis of said pin is exactly at a right angle to the plane face 13.

Means are provided to firmly and releasably clamp the pin 20 in position in the notches 19 and, in this instance, I employ a forked clamp 21, the forked end of said clamp resting on the pin 20 and the rear end thereof having a hole 22 engaged by the upper end of an adjusting post 23 which is provided with a shoulder 24 upon which the underface of the clamp 21 seats. The post 23 is threaded at its lower end into the bottom of the bracket 17. Turning of the post 23 will effect vertical adjustment of it for levelling the clamp 21 for different diameters of the pin 20 so that the clamp will bear vertically upon the pin 20, different diameters of said pin being necessitated by different sizes of the connecting rod wrist pin bearings. The clamp 21 is provided with a notch 25 to accommodate a clamping screw 26 which is threaded into the bottom of the bracket 17. The screw 26 is provided with a shoulder 27 which engages the upper face of the clamp 21 so that when the screw 26 is screwed home it bears against the clamp and holds said clamp securely on the pin 20.

The standards 18 are provided with transversely extending plane faces or shoulders 28 which extend slightly aslant to the vertical for a purpose hereinafter mentioned.

The base 10 is provided with two other standards 29 adjacent its longitudinal margins and said standards are provided with V-shaped notches 30 in their upper edges. Said notches accurately position the bearings 39, 40, of a boring tool 31 so that the axis of said boring bar will be exactly parallel with the axis of the pin 20 and at a right angle to the plane face 13.

Means are provided to firmly and releasably clamp the bearings 39, 40 in the notches 30 and, in this instance, I employ clamps 32, 321 to engage the upper side of the bearings. The clamp 32 is provided near each end and the clamp 321 is provided near one end with a hole 33 to receive a clamping screw 34. The screws 34 are threaded into the upper edges of the standards 29, and coil springs 35 surround the screws 34 and are interposed between the standards 29 and the clamps to support the clamps when the bearings 39, 40 are removed, so that said bearings may be easily replaced.

To hold the other end of the clamp 321 toward the associated standard 29, said clamp is engaged by a screw 36 which is threaded through a yoke 37 pivoted at 38 to the standard. The pivot 38 extends transversely of the standard 29 so that the yoke 37 may be swung to position to bring the screw 36 over the clamp 321 as in solid lines in Figure 2, or to the dotted position indicated at $a$ to release the clamp 321 from binding upon the bearing 39.

The bearing 39 is provided at its outer end with an ear 41, to which are hinged at 42 two sections 43, 44 of a feed nut adapted, when the sections are closed, to engage feed screw-threads 45 of the boring bar 31. To the nut section 44 is pivoted at 46 a latch 47 having a head 48. On the latch 47 is shiftably mounted a collar 49 and between the collar and the head 48 is interposed a coil spring 50 which yieldingly holds the collar in contact with the outer face of the section 43, when the latch 47 is positioned in a slot 51 in one end of the nut section 43. The boring bar is provided at its screw threaded end with radially extending arms 52 whereby said boring bar may be readily turned to feed it through the bearings 39, 40. The boring bar is provided with a transversely extending hole 53 in which the cutting tool may be placed, said tool being held by a set screw 54.

Adjacent that end of the base 10 having the standards 29, said base is provided with a pair of brackets 55. Slidably mounted on said brackets is a carriage 56 provided with slots 57 to receive cap screws 58 which are threaded into the respective brackets 55. The cap screws 58 are provided with washers 59 that bear upon the upper face of the carriage 56 when the cap screws are tightened, thus securely holding the carriage in the position nearer to or farther from the boring tool 31.

The carriage 56 is provided at its opposite ends with up-standing ears 60 to which are pivoted at 61 ears 62 of a support 63 that is in the form of a frame. A clamp, comprising two members 64 on opposite sides of the support 63, is provided with longitudinally extending slots 65 to receive bolts 66 which extend through said slots and into the crank bearing 67 of the connecting rod that is being operated upon, such connecting rod being indicated at 68. It will be understood that the bolts 66, while the connecting rod is being operated upon, are employed in lieu of the bolts usually employed for holding the sections of the connecting rod crank bearing together, said bolts 66 being considerably longer and having shoulders 69 to engage the outer face of one of the clamp members 64. When the nuts 70 on the bolts 66 are tightened, the supports 63 will be securely clamped between the members 64, thus to hold the members 64 and the crank bearing end of the connecting rod in the desired position, with the axis of the connecting rod bearing 67 aligned with the axes of the bearings 39, 40.

The inner ends of the journals 39, 40 are reduced in diameter and screw-threaded as indicated at 71 and engaging said screw threads are nuts 72 whose function will be made clear hereinafter.

The invention above described is used as follows:

It will be understood that it is very important, when the piston is mounted on the connecting rod and said rod assembled on the crank shaft with the piston in the cylinder of the engine, alinement of the wrist pin with the crank shaft and alinement of the piston with the wall of the cylinder be substantially perfect in order to obtain the best results in operation of the engine. If the connecting rod needs straightening, the first operation is to insert the pin 20 through the wrist pin bearing of the connecting rod, and to insert the bar tool, or a pin of like diameter, through the crank bearing 67 and place the connecting rod with said pins in the respective notches 19, 30. The clamps 21, 32, 321 will then be secured in place.

The second operation is to measure from the bearings of the connecting rod to the standards 12, 29 to ascertain whether or not the connecting rod is perfectly straight; that is to say whether or not it is perpendicular to the axis of the boring tool 31. It will be understood that in making these measurements allowance must be made for whatever offset there may be between either the bearings of the connecting rod or the inner faces of the standards 12, 29. It is essential that the connecting rod be straight for the reason that its bearing 67, when in place on the crank shaft, is always in a definite position and, if the rod were not straight, even though the wrist pin were exactly parallel with the crank shaft, the piston would be pressed against one side of the cylinder, making it wear unequally. If this operation prove that the connecting rod is not straight it will be straightened and then again tested, and the straightening operation will be repeated until the measurements show that it is approximately straight.

The third operation is to ascertain whether or not the connecting rod is twisted. If it is twisted one end of the pin 20 will rest on one of the standards 18 and the other end will be spaced from the other standard. The twist will be removed so that the pin will rest on both faces.

The fourth operation is to move the connecting rod laterally until the periphery of the piston touches the face 13. If the piston is canted to one side or the other such fact will be immediately known since, under such circumstances, the piston will not lie true from end to end along the face 13. If the piston does not fit true against the face 13, the wrist pin bearing will be bent to correct this error.

The fifth operation is to measure the distance from the head end of the piston to the adjacent edge of the base so that such measurement may be checked up with similar measurements made when testing the other connecting rods belonging to the same engine, in order that all the pistons will be equally spaced from the heads of the respective cylinders when the pistons are at the end of their compression strokes.

Before performing the foregoing operations, the support 63 will be thrown into the dotted line position indicated in Figure 3. These operations have been described in the above mentioned copending application and those features which are in common between the former and present inventions are not claimed herein since they are the subject of the claims of the former application.

To describe a further use of this invention, it will be assumed that the connecting rod crank bearing has been re-babbitted and that it is desired to bore and face the bearing to prepare it for proper assembling with the crank shaft. In such event the bolts 66 will be secured to the bearings 67 and, the support 63 having been swung into the position shown in solid lines in Figure 3, the clamp members 64 will be clamped to the support 63 by the bolts 66 and nuts 70. It is preferable before this is done to loosen the cap screws 58. The bearings 39, 40 will then be clamped in position on the standards 29 and the boring tool 31 inserted in said bearings. Then the screws 58 will be tightened. The feed nut will then be closed upon the feed screw and, assuming that the cutting tool has been mounted in the hole 53, the boring tool will be rotated causing the cutting bar to bore the bearing to the desired diameter. After this has been effected the cutting tool will be adjusted for facing off one end of the bearing, the feed nut will be opened, the boring bar will be moved endwise in its bearings to bring the cutter between one of the nuts 72 and the adjacent end of the bearing, and the connecting rod will be adjusted to position close to the cutter. Then the boring bar will be rotated and the cutter will be fed the desired amount toward the bearing by turning the adjacent nut 72. The nut 72 bears against the cutter and forces the cutter against the face of the bearing so as to make the desired cut therein, the boring bar sliding in its bearings because of the feed nut being released from the boring bar. When this facing operation is completed, it may be repeated for the other end of the bearing by using the other nut 72 for feeding the cutting tool.

From the foregoing it will be understood that the axis of the bored crank shaft bearing of the connecting rod will be absolutely parallel with the axis of the wrist pin so that when the piston is assembled on the connecting rod said piston will run true in the cylinder.

I claim:

1. In a connecting rod tool, the combination of a base, a standard mounted on the base, clamping means secured to the standard to support the wrist pin of a connecting rod, a pair of standards having V-shaped notches, bearings, means to clamp the bearings in the notches, a boring tool in the bearings provided with screw-threads, a feed nut secured to one of the bearings and engaging the screw-threads, and means to hold the crank bearing end of the connecting rod.

2. In a connecting rod tool, the combination of a base, means on the base to support the wrist pin of a connecting rod, a pair of standards having V-shaped notches, bearings, means to clamp the bearings in the notches, a boring tool in the bearings provided with screw-threads, a feed nut secured to one of the bearings and engaging the screw-threads, and means to hold the crank bearing end of the connecting rod.

3. In a connecting rod tool, the combination of a base having a plane face, a standard mounted on the base and having a plane face at a right angle to the plane face of the base, a bracket adjustable along the standard comprising spaced standards having V-shaped notches, means to clamp a wrist pin in the notches, means on the base to hold the crank bearing end of a connecting rod, a boring tool rotatably mounted on the base in position to extend through the crank bearing, and means to effect endwise feed of the boring tool as it is rotated.

4. In a connecting rod tool, the combination of a base, bearings mounted on the base in spaced relation, a boring bar in said bearings provided with a cutting tool, means to hold a connecting rod between the bearings with the boring bar extending through the crank bearing of the connecting rod, releasable means to effect longitudinal feed of the boring bar, when said bar is turned, and a nut having screw-threaded engagement with one of the bearings and adapted when turned in one direction to bear against the cutting tool to force said tool against the adjacent end face of the crank bearing when the boring bar feed means are released and said bar is turned to rotate the cutting tool.

Signed at Los Angeles, California, this 16th day of August, 1922.

HERBERT H. BAKER.